United States Patent
Chen

(10) Patent No.: US 9,557,832 B2
(45) Date of Patent: Jan. 31, 2017

(54) CURSOR CONTROL APPARATUS AND CURSOR CONTROL METHOD THEREOF

(71) Applicant: GETAC TECHNOLOGY CORPORATION, Hsinchu County (TW)

(72) Inventor: Ching-Chuan Chen, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 70 days.

(21) Appl. No.: 14/468,053

(22) Filed: Aug. 25, 2014

(65) Prior Publication Data

US 2016/0054817 A1 Feb. 25, 2016

(51) Int. Cl.
G06F 3/0354 (2013.01)

(52) U.S. Cl.
CPC ....... *G06F 3/03543* (2013.01); *G06F 3/03547* (2013.01)

(58) Field of Classification Search
CPC .. G06F 3/04886; G06F 3/1431; G06F 1/1647; G06F 2203/04801; G06F 3/1423; G06F 1/165; G06F 3/033; G06F 3/04892; G09G 5/14; G09G 2354/00; G09G 2320/045; G09G 3/2074; G05B 2219/23152; H01L 2251/568
See application file for complete search history.

(56) References Cited

U.S. PATENT DOCUMENTS

| | | | |
|---|---|---|---|
| 5,793,361 A | 8/1998 | Kahn et al. | |
| 6,072,469 A | 6/2000 | Chen et al. | |
| 6,219,027 B1 * | 4/2001 | Shimizu | G06F 3/038 345/2.1 |
| 6,331,840 B1 | 12/2001 | Nielson et al. | |
| 6,470,341 B1 | 10/2002 | Rekimoto | |
| 6,549,214 B1 | 4/2003 | Patel et al. | |
| 6,842,795 B2 | 1/2005 | Keller | |
| 7,124,374 B1 | 10/2006 | Haken | |
| 7,355,593 B2 | 4/2008 | Hill et al. | |
| 7,430,721 B2 | 9/2008 | Johanson et al. | |
| 7,696,978 B2 | 4/2010 | Mallett et al. | |
| 8,194,036 B1 * | 6/2012 | Braun | G06F 1/163 345/157 |
| 2008/0301675 A1 | 12/2008 | Cromer et al. | |
| 2010/0333041 A1 | 12/2010 | Fabrick, II | |
| 2015/0002397 A1 * | 1/2015 | Song | G06F 3/03543 345/163 |
| 2016/0077605 A1 | 3/2016 | Chen | |

FOREIGN PATENT DOCUMENTS

CN 1325060 A 12/2001

\* cited by examiner

*Primary Examiner* — Sahlu Okebato

(57) ABSTRACT

A cursor control apparatus and a cursor control method thereof are provided. Adjust a displacement value according to a DPI ratio of an extending display unit to a benchmark display unit in an axial direction to generate a modified displacement value, and move a cursor on the extending display unit according to the modified displacement value, so that the velocities of the cursor on the extending display unit and the benchmark display unit are substantially equal.

6 Claims, 4 Drawing Sheets

CURSOR CONTROL APPARATUS AND CURSOR CONTROL METHOD THEREOF

BACKGROUND OF THE INVENTION

Field of the Invention

The present invention relates to input apparatuses, and more particularly, to a cursor control apparatus and a cursor control method thereof.

Description of the Prior Art

Extended display entails connecting a host computer to at least two display screens in a computer system to allow the desktop of a Windows operating system to span multiple screens and thus create desktop accessible space larger than a single screen. Extended display is particularly important to notebook computer users. In general, since the screen of a notebook computer is small, a user who needs to work with multiple application windows simultaneously must have the application windows overlapped and displayed on the desktop to the detriment of ease of reading window contents. To overcome the aforesaid drawback, the user can resort to extended display whereby the host computer is connected to at least one external screen such that a portion of windows is disposed on the extended desktop.

Due to advancements of display unit technology, not only is the resolution of screens becoming higher in recent years, but various display units which come in different sizes are also commercially available in order to meet customer needs at different levels. Hence, the DPI (dots per inch) values of the display units for use by users in effectuating extended display are always different from the default DPI values of the display units. Therefore, the velocity and position of a cursor changes whenever the cursor moves between display unit frames with different DPI values; as a result, cursor control deteriorates, and thus user's perception is compromised. Hence, users have to accommodate to the changes in the velocity of the cursor which moves across display units with different DPI values. Moreover, in the situation where display unit frames with different DPI values are arranged side by side, as soon as the cursor crosses the boundary between one display unit and another display unit, the cursor "leaps" vertically and thus its path is never smooth. Likewise, in the situation where display unit frames with different DPI values are arranged one above the other, as soon as the cursor crosses the boundary between one display unit and another display unit, the cursor "leaps" horizontally and thus its path is never smooth.

SUMMARY OF THE INVENTION

The present invention provides a cursor control apparatus and a cursor control method thereof conducive to enhancement of the quality control of a cursor.

The cursor control apparatus of the present invention, which is applicable to the adjustment of the velocity of a cursor displayed on a benchmark display unit and an extended display unit, ensures that the velocities of the cursor on the extended display unit and the benchmark display unit are substantially equal. The cursor control apparatus comprises a cursor control unit and a processing unit. The cursor control unit generates a displacement value when moved. The processing unit is coupled to the benchmark display unit, the extended display unit, and the cursor control unit to calculate the resolution (dots per inch, DPI) ratio of the extended display unit to the benchmark display unit in the same axial direction, adjust the displacement value according to the DPI ratio so as to generate a modified displacement value, and move the cursor on the extended display unit according to the modified displacement value such that the cursor has the same velocity on the extended display unit and the benchmark display unit.

In an embodiment of the present invention, the DPI ratio in the same axial direction includes the DPI ratio in a first axial direction and the DPI ratio in a second axial direction, wherein the modified displacement value generated includes the modified displacement values in the first axial direction and the second axial direction, respectively.

In an embodiment of the present invention, the processing unit multiplies the displacement value in the first axial direction by the DPI ratio of the extended display unit to the benchmark display unit in the first axial direction so as to obtain the modified displacement value in the first axial direction and multiplies the displacement value in the second axial direction by the DPI ratio of the extended display unit to the benchmark display unit in the second axial direction so as to obtain the modified displacement value in the second axial direction.

In an embodiment of the present invention, the cursor control unit comprises a mouse and a touch panel.

The cursor velocity adjustment method of the present invention is adapted to adjust a velocity of a cursor displayed on a benchmark display unit and an extended display unit such that the velocities of the cursor on the extended display unit and the benchmark display unit are substantially equal. The cursor velocity adjustment method comprising the steps of: calculating a resolution (dots per inch, DPI) ratio of the extended display unit to the benchmark display unit in a same axial direction; detecting a displacement value of a cursor control unit; adjusting the displacement value according to the DPI ratio so as to generate a modified displacement value; and moving the cursor displayed on the benchmark display unit and the extended display unit according to the modified displacement value.

In an embodiment of the present invention, the DPI ratio in the same axial direction includes the DPI ratio in a first axial direction and the DPI ratio in a second axial direction, wherein the modified displacement value generated includes the modified displacement values in the first axial direction and the second axial direction, respectively.

In an embodiment of the present invention, the step of adjusting the displacement value according to the DPI ratio so as to generate the modified displacement value comprises: multiplying the displacement values in the first and second axial directions by the DPI ratios of the extended display unit to the benchmark display unit in the first and second axial directions, respectively, so as to obtain the modified displacement values in the first and second axial directions, respectively.

In an embodiment of the present invention, the cursor control unit comprises a mouse and a touch panel.

In conclusion, the present invention involves adjusting a displacement value according to the resolution (dots per inch, DPI) ratio of extended display unit to benchmark display unit in the same axial direction so as to generate a modified displacement value and moving the cursor on extended display unit according to the modified displacement value such that the velocity of the cursor remains unchanged after the cursor has moved to a display unit of a different resolution, thereby enhancing the quality control of the cursor.

BRIEF DESCRIPTION OF THE DRAWINGS

The aforesaid features and advantages of the present invention are hereunder illustrated with embodiments in conjunction with the accompanying drawings, in which.

DETAILED DESCRIPTION OF THE EMBODIMENTS

Figure 1:
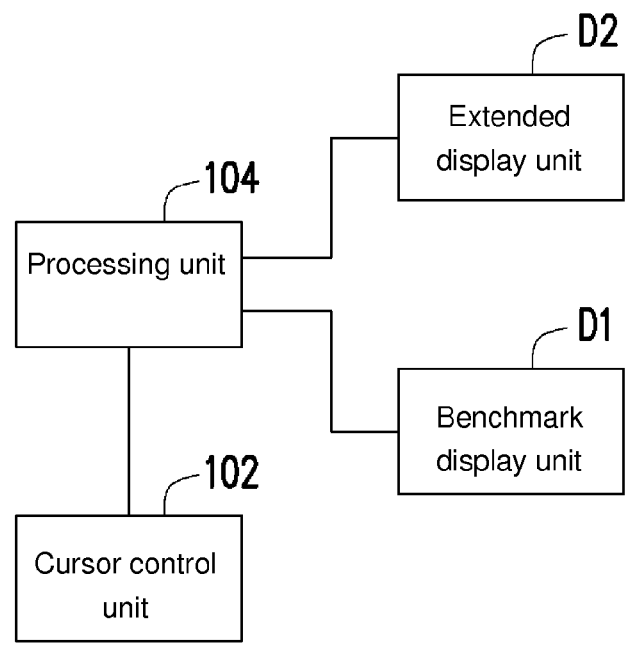
FIG. 1 is a schematic view of a cursor control apparatus according to an embodiment of the present invention.

FIG. 1 is a schematic view of a cursor control apparatus according to an embodiment of the present invention. The cursor control apparatus comprises a cursor control unit 102 and a processing unit 104. The cursor control unit 102 is coupled to the processing unit 104. The processing unit 104 is further coupled to benchmark display unit D1 and extended display unit D2. The benchmark display unit D1 and extended display unit D2 have different DPI values. Specifically speaking, the DPI value of benchmark display unit D1 is larger than the DPI value of extended display unit D2. The cursor control apparatus adjusts the velocity of the cursor displayed on benchmark display unit D1 and extended display unit D2, such that the velocities of the cursor on extended display unit D2 and benchmark display unit D1 are substantially equal. Hence, the cursor crossing the boundary between display units with different DPI values can go from benchmark display unit D1 to extended display unit D2 smoothly, thereby enhancing the quality control of the cursor.

Specifically speaking, the cursor control unit 102 is an input apparatus such as a mouse or a touch panel, for controlling the movement of the cursor. When moved, the cursor control unit 102 (such as a mouse) generates a displacement value corresponding to the movement and sends the displacement value to the processing unit 104. The processing unit 104 calculates a DPI ratio of extended display unit D2 to benchmark display unit D1 in the same axial direction, and adjusts the displacement value according to the DPI ratio so as to generate a modified displacement value, and moves the cursor on extended display unit D2 according to the modified displacement value, such that the velocities of the cursor on extended display unit D2 and benchmark display unit D1 are substantially equal.

Figure 2A:
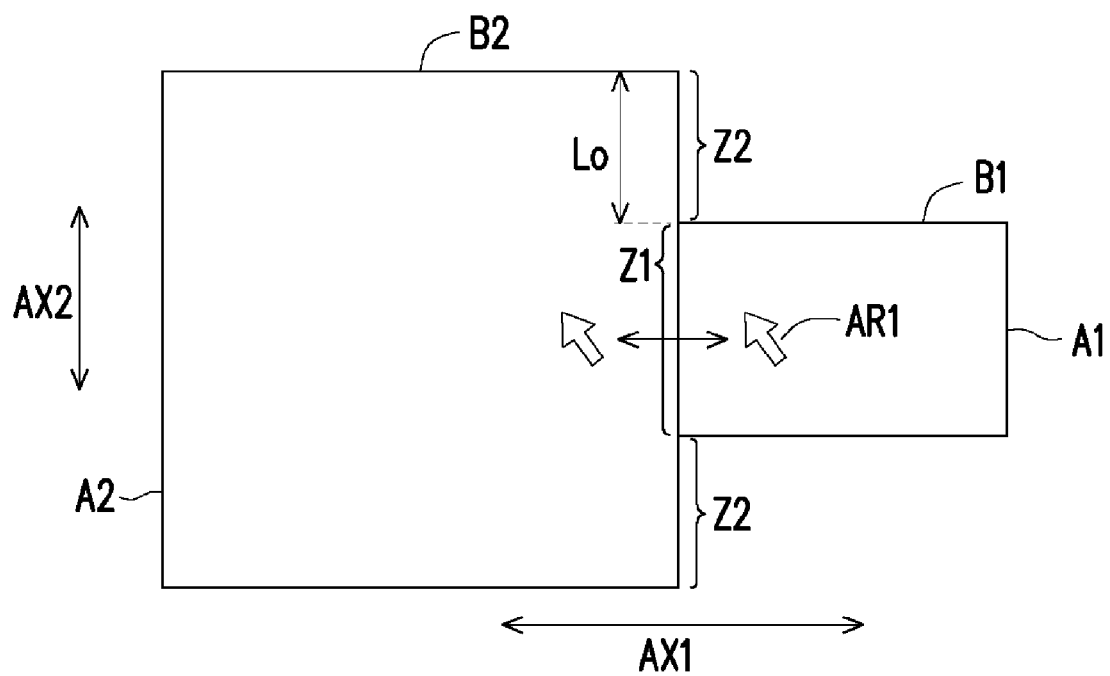
FIG. 2A is a schematic view of a cursor moving within display regions of an extended display unit and a benchmark display unit according to an embodiment of the present invention.

For instance, FIG. 2A is a schematic view of a cursor moving within display regions of an extended display unit and a benchmark display unit according to an embodiment of the present invention. Display region A1 and display region A2 are virtual display regions of benchmark display unit D1 and extended display unit D2, respectively. The display region A1 and display region A2 are aligned in first axial direction AX1 and arranged side by side. In this embodiment, the DPI values of display region A1 in first axial direction AX1 and second axial direction AX2 are denoted with DX1 and DY1, respectively, whereas the DPI values of display region A2 in first axial direction AX1 and second axial direction AX2 are denoted with DX2 and DY2, respectively. After cursor AR1 has moved from display region A1 to display region A2, the modified displacement value M1' of cursor AR1 within display region A2 and in first axial direction AX1 is expressed by the equation as follows:

$$M1'=M1(DX2/DX1) \qquad (1)$$

wherein M1 denotes the displacement value generated in first axial direction AX1 by the cursor control unit 102 as the cursor control unit 102 is moved, when cursor AR1 is within display region A2. Moreover, the modified displacement value M2' of cursor AR1 within display region A2 and in second axial direction AX2 is expressed by the equation as follows:

$$M2'=M2(DY2/DY1) \qquad (2)$$

wherein M2 denotes the displacement value generated in second axial direction AX2 by the cursor control unit 102 as the cursor control unit 102 is moved, when cursor AR1 is within display region A2.

The present invention is characterized by adjusting the position of cursor AR1 within display region A2 according to a DPI ratio in the same axial direction. That is, move cursor AR1 within display region A2 according to the modified displacement value, such that the velocities of cursor AR1 within display region A1 and display region A2 are equal. Hence, when users move the cursor control unit 102 (such as a mouse) at the same velocity in order to control the movement of cursor AR1, the velocity of cursor AR1 remains unchanged even after cursor AR1 has entered display region A2 with a different DPI value, and in consequence the users keep a good control over the movement of cursor AR1, thereby enhancing the quality control of the cursor.

Moreover, in another embodiment, the processing unit 104 further determines the coordinates of the current position of cursor AR1 and controls cursor AR1 to move in first axial direction AX1 according to the coordinates of the current position of cursor AR1 and the displacement value generated from the cursor control unit 102. When cursor AR1 moves from display region A2 to display region A1 or moves from display region A1 to display region A2, the processing unit 104 selects one of the first DPI ratio and the second DPI ratio (wherein the first DPI ratio equals DX1/DX2, and the second DPI ratio equals DX2/DX1, wherein the first DPI ratio is larger than the second DPI ratio) and adjusts the position of cursor AR1 in second axial direction AX2, such that cursor AR1 moves back and forth between display region A1 and display region A2 substantially linearly without leaping suddenly.

For instance, referring to FIG. 2A, when cursor AR1 moves in first axial direction AX1 to go from display region A1 to display region A2, the processing unit 104 selects first DPI ratio and adjusts the position of cursor AR1 in second axial direction AX2 according to the equation as follows:

$$Y1'=Y1(DX1/DX2)+Lo \qquad (3)$$

wherein Y1 denotes the distance between cursor AR1 and boundary B1 of display region A1 in second axial direction AX2, Y1' denotes the distance between cursor AR1 and boundary B2 of display region A2 in second axial direction AX2, and Lo denotes the distance between boundary B1 of display region A1 and boundary B2 of display region A2.

Likewise, when cursor AR1 moves in first axial direction AX1 to go from display region A2 to display region A1, the processing unit 104 selects the second DPI ratio and adjusts the position of cursor AR1 in second axial direction AX2 according to the equation as follows:

$$Y1'=(Y1-Lo)(DX2/DX1) \quad (4)$$

By equation (3) and equation (4), as soon as cursor AR1 moves to a display region with a different DPI value, the position of cursor AR1 in second axial direction AX2 is adjusted, such that cursor AR1 moves back and forth between display region A1 and display region A2 substantially linearly without leaping suddenly.

Referring to FIG. 2A, display region A1 and display region A2 include contiguous zone Z1 (i.e., the overlapped portion at the boundary between display region A1 and display region A2) and incontiguous zone Z2 (i.e., the non-overlapped portion at the boundary between display region A1 and display region A2) in first axial direction AX1. In the situation where cursor AR1 crosses contiguous zone Z1 between display region A1 and display region A2 and thus moves to and fro, it is practicable to adjust the position of cursor AR1 in second axial direction AX2 by equation (3) and equation (4).

By contrast, if cursor AR1 is going to cross incontiguous zone Z2 in order to move from display region A1 to display region A2, the processing unit 104 will confine cursor AR1 to display region A1, such that the users can control the movement of cursor AR1 intuitively.

Although the embodiment of FIG. 2A discloses that the cursor control apparatus is exemplified by a horizontal axial direction which functions as first axial direction AX1, the present invention is not limited thereto. For instance, in another embodiment, a vertical axial direction functions as first axial direction AX1. Persons skilled in the art are able to make reference to the aforesaid embodiments and thus infer various ways of controlling the cursor AR1 when the vertical axial direction functions as first axial direction AX1. Hence, related details are not described herein for the sake of brevity.

Figure 2B:
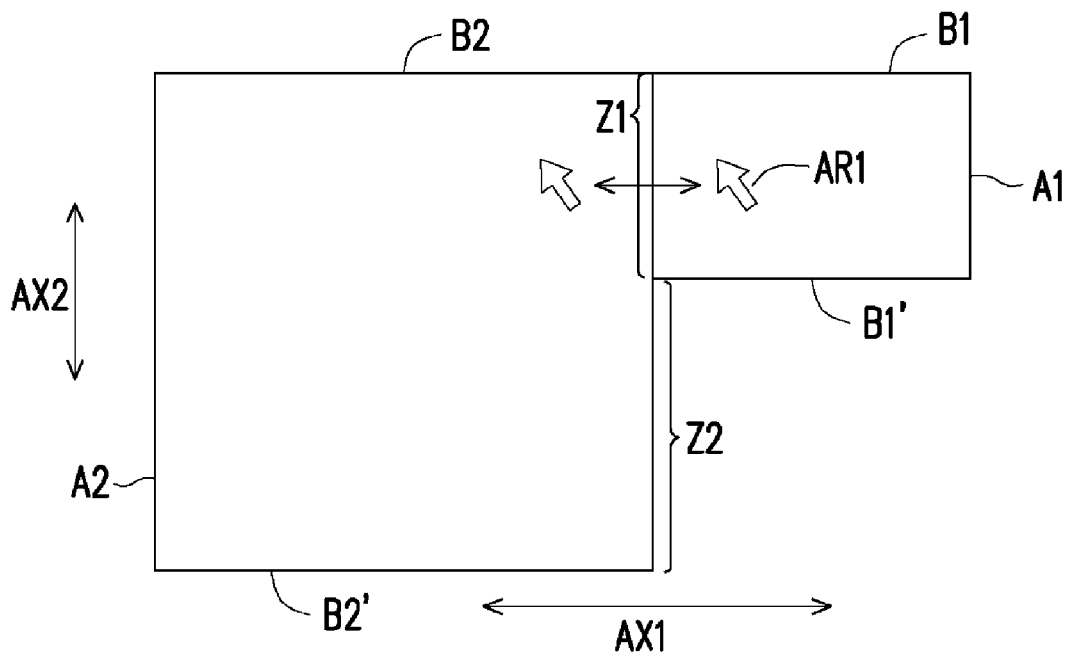
FIG. 2B is a schematic view of the cursor moving within the display regions of the extended display unit and the benchmark display unit according to another embodiment of the present invention.

FIG. 2B is a schematic view of the cursor moving within the display regions of the extended display unit and the benchmark display unit according to another embodiment of the present invention. The differences between the embodiment of FIG. 2B and the embodiment of FIG. 2A are described below. In the embodiment of FIG. 2A, the connected and overlapped portion of display region A1 and display region A2 is located at the middle of display region A2, that is, boundary B1 of display region A1 does not align with boundary B2 of display region A2. By contrast, in the embodiment of FIG. 2B, boundary B1 of display region A1 aligns with boundary B2 of display region A2, and thus the displacement value of cursor AR1 can be modified with equation (1) and equation (2) in the embodiment of FIG. 2A. The position of cursor AR1 in second axial direction AX2 can be adjusted with equation (3) and equation (4) in the embodiment of FIG. 2A. In the embodiment of FIG. 2B, the distance Lo between boundary B1 of display region A1 and boundary B2 of display region A2 equals 0.

Similarly, in the situation where the opposite side (i.e., boundary B1' in the embodiment of FIG. 2B) of boundary B1 of display region A1 is aligned with the opposite side (i.e., boundary B2' in the embodiment of FIG. 2B) of boundary B2 of display region A2, it is practicable to modify the displacement value of cursor AR1 with equation (1) and equation (2) in the embodiment of FIG. 2A and adjust the position of cursor AR1 in second axial direction AX2 with equation (3) and equation (4) in the embodiment of FIG. 2A. Since the adjustment of the displacement value of cursor AR1 and the position of cursor AR1 in second axial direction AX2 is not affected by the connected and overlapped portion of display region A1 and display region A2, that is, it can still be accomplished with the equations in the embodiment of FIG. 2A, no other adjustment techniques need to be described herein for the sake of brevity. In this regard, Lo denotes the distance between boundary B1 of display region A1 and boundary B2 of display region A2.

Figure 3:
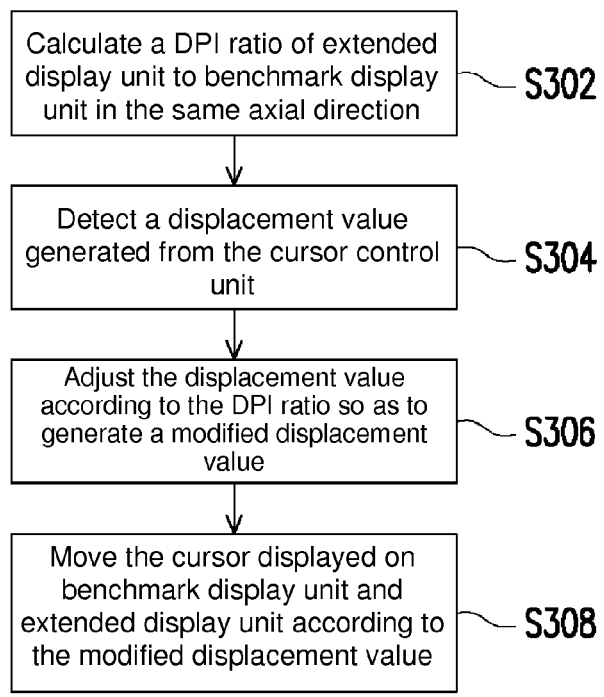
FIG. 3 is a schematic view of the process flow of a cursor velocity adjustment method according to an embodiment of the present invention.

FIG. 3 is a schematic view of the process flow of a cursor velocity adjustment method according to an embodiment of the present invention. Referring to the above description of the cursor control apparatus in the above embodiments, it is understandable that the cursor velocity adjustment method comprises the following step. First, calculate a DPI ratio of extended display unit to benchmark display unit in the same axial direction (step S302). The DPI ratio in the same axial direction includes the DPI ratio in a first axial direction and the DPI ratio in a second axial direction, wherein the modified displacement value generated indicates the modified displacement values in the first axial direction and the second axial direction, respectively. Then, detect a displacement value generated from the cursor control unit (step S304). Afterward, adjust the displacement value according to the DPI ratio so as to generate a modified displacement value (step S306). Step S306 comprises multiplying the displacement values in the first and second axial directions by the DPI ratios of the extended display unit to the benchmark display unit in the first and second axial directions, respectively, so as to obtain the modified displacement values in the first and second axial directions, respectively. Afterward, move the cursor displayed on benchmark display unit and extended display unit according to the modified displacement value (step S308).

Figure 4:
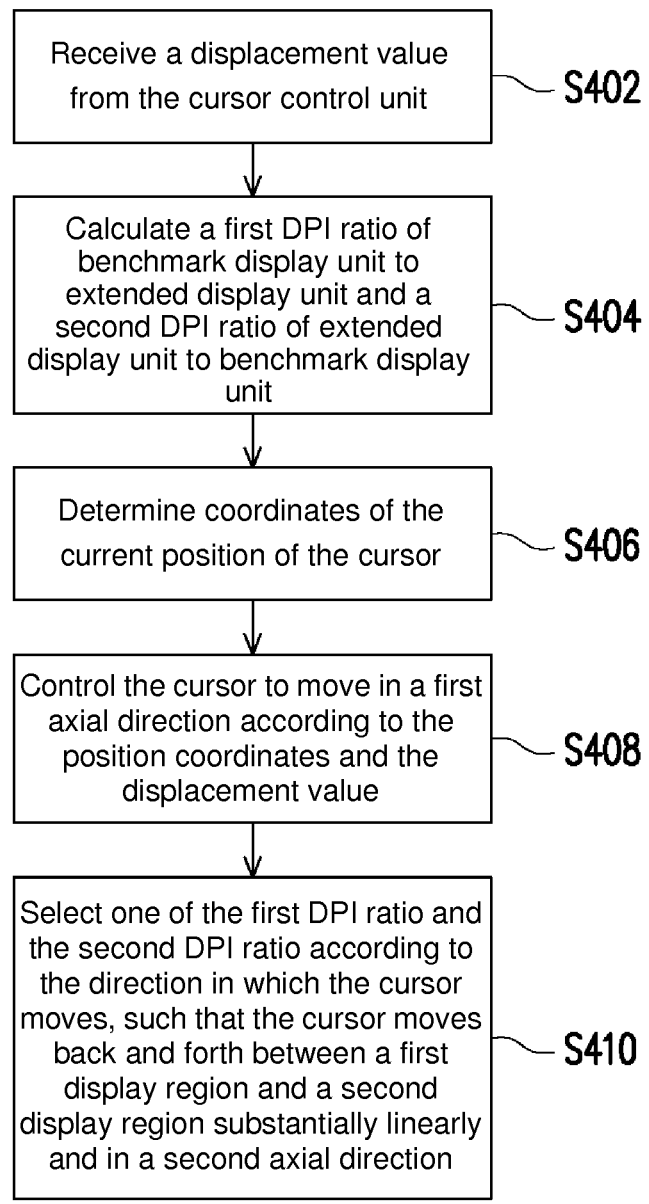
FIG. 4 is a schematic view of the process flow of a cursor control method according to an embodiment of the present invention.

FIG. 4 is a schematic view of the process flow of a cursor control method according to an embodiment of the present invention. Referring to the above embodiments for the description as to how the processing unit 104 adjusts the position of cursor AR1 in second axial direction AX2, it is understandable that the cursor control method comprises the following step. First, receive a displacement value from the cursor control unit (step S402). Then, calculate a first DPI ratio of the benchmark display unit to the extended display unit and a second DPI ratio of the extended display unit to the benchmark display unit (step S404), wherein, in this embodiment, the benchmark display unit have the first display region, and the extended display unit have the second display region, wherein the first display region is adjacent to the second display region in the first axial direction, wherein the first DPI ratio is larger than the second DPI ratio. Then, determine the coordinates of the current position of the cursor (step S406). Afterward, control the cursor to move in a first axial direction according to the position coordinates and the displacement value (step S408), wherein the first axial direction may be a horizontal axial direction or a vertical axial direction. Finally, select one of the first DPI ratio and the second DPI ratio according to the direction in which the cursor moves, such that the cursor moves back and forth between a first display region and a second display region substantially linearly and in a second axial direction (step S410), wherein the first axial direction is perpendicular to the second axial direction. For instance, step S410 entails selecting the first DPI ratio when the cursor moves in the first axial direction to go from the first display region to the second display region, and selecting the second DPI ratio when the cursor moves in the first axial direction to go from second display region to the first display region.

Figure 5:
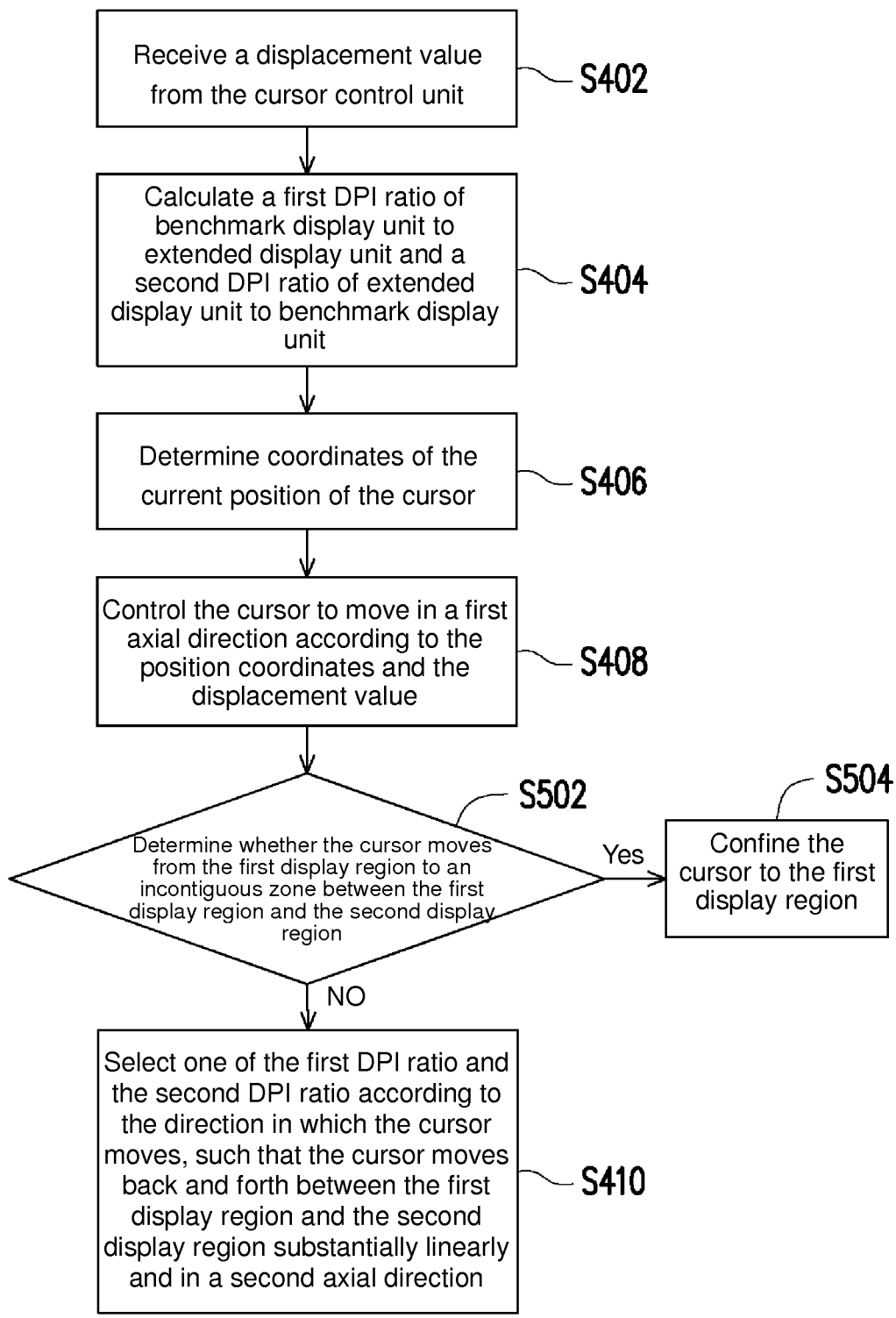
FIG. 5 is a schematic view of the process flow of the cursor control method according to another embodiment of the present invention.

FIG. 5 is a schematic view of the process flow of the cursor control method according to another embodiment of the present invention. The differences between the embodiment of FIG. 5 and the embodiment of FIG. 4 are described below. The embodiment of FIG. 5 further comprises step S502 and step S504. After step S408, the cursor control method of the embodiment of FIG. 5 further determines whether the cursor moves from the first display region to the incontiguous zone between the first display region and the second display region (step S502). If the cursor moves from the first display region to the incontiguous zone between the first display region and the second display region, the cursor will be confined to the first display region (step S504). Conversely, if the cursor does not move from the first display region to the incontiguous zone between the first display region and the second display region, the process flow of the method goes to step S410 which entails selecting one of first DPI ratio and second DPI ratio according to the direction in which the cursor moves.

In conclusion, the present invention involves adjusting a displacement value according to the DPI ratio of extended display unit to benchmark display unit in the same axial direction so as to generate a modified displacement value and moving the position of the cursor on extended display unit according to the modified displacement value such that the velocity of the cursor remains unchanged after the cursor has moved to a display unit of a different resolution, thereby enhancing the quality control of the cursor. Moreover, in another embodiment, it is practicable to adjust the position of the cursor in the second axial direction when the cursor moves between display units with different resolutions according to the DPI ratios of display units with different DPI values in first axial direction, such that the cursor moves smoothly between the display units with different resolutions, so as to enhance the quality control of the cursor, wherein the first axial direction is perpendicular to the second axial direction, and the display units with different DPI values are aligned in the first axial direction and arranged side by side. In yet another embodiment, if the cursor is located within the incontiguous zone while moving from the first display region to the second display region, the cursor will be confined to the first display region, such that users can control the movement of the cursor intuitively.

What is claimed is:

1. A cursor control apparatus, adapted to adjust a velocity of a cursor displayed on a benchmark display unit and an extended display unit such that the velocities of the cursor on the extended display unit and the benchmark display unit are substantially equal, the cursor control apparatus comprising:
   a cursor control unit for generating a displacement value when moved on the benchmark display unit; and
   a processing unit coupled to the benchmark display unit, the extended display unit, and the cursor control unit to calculate a resolution (dots per inch, DPI) ratio of the extended display unit to the benchmark display unit in a same axial direction, wherein the DPI ratio in the same axial direction comprises a first DPI ratio of the extended display unit to the benchmark display unit in a first axial direction and a second DPI ratio of the extended display unit to the benchmark display unit in a second axial direction;
   wherein the processing unit multiplies a first displacement value of the cursor control unit in the first axial direction by the first DPI ratio so as to obtain a first modified displacement value in the first axial direction, multiplies a second displacement value of the cursor control unit in the second axial direction by the second DPI ratio so as to obtain a second modified displacement value in the second axial direction, moves the cursor on the extended display unit according to the first and second modified displacement values, and moves the cursor on the benchmark display according to the first and second displacement values, such that the velocities of the cursor on the extended display unit and the benchmark display unit are substantially equal.

2. The cursor control apparatus of claim 1, wherein the cursor control unit comprises a mouse and a touch panel.

3. A cursor velocity adjustment method, adapted to adjust a velocity of a cursor displayed on a benchmark display unit and an extended display unit such that the velocities of the cursor on the extended display unit and the benchmark display unit are substantially equal, the cursor velocity adjustment method comprising the steps of:
   calculating a resolution (dots per inch, DPI) ratio of the extended display unit to the benchmark display unit in a same axial direction, wherein the DPI ratio in the same axial direction comprises a first DPI ratio of the extended display unit to the benchmark display unit in a first axial direction and a second DPI ratio of the extended display unit to the benchmark display unit in a second axial direction;
   detecting a displacement value of a cursor control unit, wherein the displacement value comprises a first displacement value in the first axial direction and a second displacement value in the second axial direction;
   generating a modified displacement value by multiplying the first displacement value in the first axial direction by the first DPI ratio so as to obtain a first modified displacement value in the first axial direction, and multiplying the second displacement value in the second axial direction by the second DPI ratio so as to obtain a second modified displacement value in the second axial direction;
   when the cursor is on the benchmark display unit, moving the cursor on the benchmark display according to the first and second displacement values; and
   when the cursor is on the extended display unit, moving the cursor displayed on the extended display unit according to the first and second modified displacement values.

4. The cursor velocity adjustment method of claim 3, wherein the cursor control unit includes a mouse and a touch panel.

5. The cursor control apparatus of claim 1, wherein, when the extended display unit and the benchmark display unit are adjacent in the first axial direction, the processing unit further adjusts a location of the cursor on the extended display unit according to a distance between a boundary of a display region of the extended display unit and a boundary of a display region of the benchmark display unit in the second axial direction when the cursor moves the extended display unit from the benchmark display unit.

6. The cursor velocity adjustment method of claim 3, further comprising a step of adjusting a location of the cursor on the extended display unit according to a distance between a boundary of a display region of the extended display unit and a boundary of a display region of the benchmark display unit when the extended display unit and the benchmark display unit are adjacent in the first axial direction, and the cursor moves the extended display unit to the benchmark display unit.

* * * * *